3,346,530
POLYVINYL ALCOHOL COMPOSITIONS PLASTICIZED WITH MONOPHENYL ETHERS OF POLYOXY ETHYLENE GLYCOLS

Joseph G. Martins, Ludlow, Mass., assignor, by mesne assignments, to Monsanto Company, a corporation of Delaware
No Drawing. Filed July 31, 1963, Ser. No. 299,081
1 Claim. (Cl. 260—33.2)

This invention relates to compositions of vinyl alcohol polymers plasticized with particular water-dispersible compounds, the compositions being particularly suitable for the preparation of water-dispersible film useful for packaging detergents, dyes, insecticides, bleaching agents and similar materials. More particularly, the invention relates to the plasticization of vinyl alcohol polymers with monophenyl ethers of polyoxyethylene compounds to provide compositions which facilitate the preparation of water-dispersible films and confer improved properties on said films.

A water-dispersible film is either one that is completely soluble in water or one that is sufficiently water-soluble so that it can be successfully employed in packaging detergents, etc., for a use which consists in dispensing the detergent by immersing the entire package in water; the film must disintegrate sufficiently so that the detergent is released even if some insoluble portion of the packaging material remains.

Water-dispersible films have been prepared from vinyl alcohol polymers plasticized either internally or externally. Plasticization has been effected heretofore primarily to flexibilize the film at low temperatures in order to combat the brittleness of said films at those temperatures, especially in packaging applications.

The known external plasticizers for vinyl alcohol polymers are polyols, including the lower glycols generally and glycerine especially. Vinyl alcohol plasticized with compounds become objectionably soft at high relative humidity and are tender and brittle at low relative humidity. Another defect of the polyols and of any other type of humectant plasticizer as well is that they tend to dry out with time, leaving the film brittle or fragile; this obviously reduces its suitability for long term applications. Still another objection to the use of polyols as external plasticizers for vinyl alcohol polymers is that film so plasticized blocks or sticks to itself on storage or in use at high relative humidity or after exudation of the polyol plasticizer.

The internal plasticization of vinyl alcohol polymers has generally been accomplished by the chemical modification of the alcohol group as, for example, by ethoxylation as is shown in U.S. Patent 2,936,263. Such methods have the obvious disadvantage of adding a processing step prior to the preparation of the final form of the polymer, e.g. film. This additional processing generally requires specialized equipment and increased manpower expenditure; the higher cost resulting severely limits the commercial use of the material.

It is the purpose of the present invention to provide plasticized vinyl alcohol polymer compositions which will avoid all of the above disadvantages.

It is another purpose of the present invention to provide plasticized compositions having greatly improved properties both during the preparation of the final form of the plasticized compositions, e.g., film as well as in said final form.

It is still another object of the present invention to provide means for the preparation of the plasticized vinyl alcohol polymer compositions.

The above and related objects are accomplished with a polyvinyl alcohol plasticized with particular polyoxyethylene compounds. The particular type water-dispersible vinyl alcohol polymer employed in the plasticized composition is not deemed critical to the successful practice of the invention and suitable types along with methods of preparation are taught in U.S. Patents 2,502,715 and 2,643,994. The polyoxyethylene components of the compositions are the monophenyl ethers of polyoxyethylene containing from about 3 to about 15 ethylene oxide units per molecule.

The invention may be practiced in the preferred embodiments that will now be presented. Its scope, however, is only limited by the appended claims. In the following examples, parts and percentages where employed are on a weight basis unless otherwise specified.

Example 1

One hundred parts of an aqueous 20% solution of a partially hydrolyzed polyvinyl acetate having a residual polyvinyl acetate content of 30% and a viscosity of 4.5 centipoises for a 4% aqueous solution at 20° C. is added to a suitable mixing vessel equipped with means for mechanical agitation. Into this solution is charged 4 parts of a commercial mixture of monophenyl ethers of polyethylene oxide having an average molecular weight of 270, a specific gravity at 25° C. of 1.119 and a refractive index at 25° C. of 1.502. The plasticizer is mixed into the partially hydrolyzed polyvinyl acetate solution at room temperature with continued agitation for 10 minutes whereupon a homogeneous but bubbly solution is produced. The solution is de-bubbled by heating at 40° C. for 2 hours and films are cast from the clear colorless solution on metal plates by conventional means. The cast films are dried at 70° C. for 1 hour and then formed into small packets containing commercially available domestic detergent by means of ordinary heat-sealing techniques.

Packets so prepared were first subjected to 100% relative humidity at 23° C. for 48 hours for test purposes. After the test period, these products were observed and the film comprising said packaging envelope found to be free from tackiness, continuous and by all visual indication, substantially unchanged from its original condition. As distinct therefrom, other packets prepared from the same partially hydrolyzed polyvinyl acetate plasticized with a humectant plasticizer of the type previously disclosed when tested in like manner became sufficiently tacky to stick together, and the films of these packets were found to have lost continuity and physical integrity. Other packets prepared from the plasticized partially hydrolyzed polyvinyl acetate of the example were subjected to 3 day tests at 0% relative humidity and 23° C. and the films were found still to possess their original physical continuity and freedom from embrittlement. Additional storage tests in the refrigerator at —20° C. for 7 days did not alter the properties of films prepared from the plasticized compositions of the example.

The water-redispersibility of the above tested packets was measured by depositing said packets in warm water at 100° F. with mild agitation. The packets prepared from the plasticized composition of the example dissolved completely and released the detergent; they had thus retained the redispersibility of the original material.

The film properties of the above composition can still be further distinguished from those of films prepared from partially hydrolyzed polyvinyl acetate plasticized with humectant type plasticizers, viz, glycerine and ethylene glycol as regards improved low temperature flexibility. Test films of approximately 2 mils thickness were immersed in an air bath over calcium sulfate in a Dewar flask and the temperature of the air surrounding the films then gradually lowered. At the desired temperature of the films were briskly snapped manually and observed for cracks. Whereas the films prepared from the composition of the example cracked at −35° C. films prepared from partially hydrolyzed polyvinyl acetate plasticized with a like amount of either glycerine or ethylene glycol cracked at 0° C.

*Example 2*

A plasticized composition was prepared according to the method described in Example 1 from an aqueous mixture containing 75 parts of a partially hydrolyzed polyvinyl acetate having a viscosity of approximately 50 centipoises for a 4% solution at 20° C. and a residual acetate content of approximately 35%, with 25 parts of a commercial mixture of monophenyl ethers of polyethylene oxide having a molecular weight of approximately 500. The physical properties of films prepared from the above composition and tested according to the procedure outlined in Example 1 were substantially comparable to the physical properties of the plasticized composition of said Example 1.

*Example 3*

A plasticized composition was prepared according to the method described in Example 1 from an aqueous mixture containing 95 parts of a partially hydrolyzed polyvinyl acetate having a viscosity of approximately 25 centipoises for a 4% solution at 20° C. and the residual acetate content of approximately 40%, with 5 parts of a commercial mixture of monophenyl ethers of polyethylene oxide having a molecular weight of approximately 750. The physical properties of films prepared from the above composition and tested according to the procedure outlined in Example 1 were substantially comparable to the physical properties of the plasticized composition of said Example 1.

*Example 4*

Another composition was prepared according to the method of Example 1 except that the quantities of materials were adjusted so that the final mix would contain 20 parts of plasticizer for each 100 parts of resin. The polyethoxylated nonyl phenol having about 9 mols of ethylene oxide per molecule was substituted to the monophenyl ether of that example. The resin and the plasticizer were found to be incompatible however.

The plasticized vinyl alcohol polymers of the present invention can best be characterized by the final properties of the films prepared therefrom. The films are clear, glossy and continuous in character, and possess tensile strengths at rupture in the range 3500–8000 p.s.i. and a percent elongation at rupture of approximately 150–400%. In addition the present films can retain their physical integrity under severe climatic conditions. Retention of "physical integrity" means the undergoing of substantially less change in such physical properties such as flexibility and strength, at extreme ambient conditions, e.g. 50% relative humidity at 20° F., 100% relative humidity at 23° F., and 88% relative humidity at 140° F., than that which vinyl alcohol polymers plasticized with humectant type compounds undergo under such conditions. The plasticized compositions of the invention can also be characterized by certain novel properties exhibited during the preparation of film. More specifically, the present plasticized compositions can now be prepared in final film form by more efficient processing than was heretofore possible. For example, films may be formed by the well known blow-forming technique directly from the present compositions without need for incorporation of water into the plasticized composition as generally practiced with all other type plasticized vinyl alcohol polymer compositions. In addition, preparation of film packets from the present plasticized compositions is more efficient by reason of the greatly improved "machining" characteristics of the film. The prior art compositions tend to rupture, stick and otherwise disrupt the operation of the high speed machinery used to prepare the film packets heretofore disclosed. The present plasticized compositions also "machine" better than an unplasticized vinyl alcohol polymer.

The quantity of plasticizer that can be combined with the vinyl alcohol polymer to form plasticized resin compositions having the improved properties hereinbefore described is a function of the type and molecular weight of the vinyl alcohol polymer and the chemical structure and molecular weight of the plasticizer. The quantity of plasticizer is not limited by its compatibility with the vinyl alcohol polymer, however, since satisfactory films were obtained with the plasticizer at all levels of plasticizer content tested. The maximum quantity of plasticizer to be incorporated will therefore be determined by such considerations as desired final properties, application for the plasticized composition, etc. The minimum amount of plasticizer to be employed is likewise dictated by these same considerations although as low as 1% plasticizer was found to substantially improve the flexibility of the vinyl alcohol polymer.

The preferred plasticized compositions of this invention comprises 95–75 parts of the vinyl alcohol polymer plasticized with 5–25 parts of the polyoxyethylene compound. In the preferred range, the plasticizer is non-migratory and will yield films free from tack, limpness and greasy feel even under the adverse climatic conditions of temperature and relative humidity extremes often encountered during the warehousing and transportation of such packaged products as foods, etc. Another reason for these preferred ranges is that the best balance of improved film properties is achieved within these limits, as illustrated by the above examples.

The vinyl alcohol polymer component of the plasticized resin compositions of this invention can be selected from the general class consisting of water-dispersible copolymers of vinyl alcohols with other monomers. Useful polymers include a copolymer formed by the hydrolysis of a vinyl ester homopolymer as well as terpolymers formed by the copolymerization of a vinyl ester with another copolymerizable monomer followed by partial hydrolysis of the vinyl ester. For example, the useful vinyl ester homopolymers which may be directly hydrolyzed to yield a substantially water-dispersible polymer include vinyl acetate, vinyl propionate, vinyl butyrate, vinyl hexoate, vinyl benzoate and the like. As typical of the terpolymer type of useful vinyl alcohol polymer wherein a copolymer of a vinyl ester is further hydrolyzed to yield a substantially water-dispersible polymer, there are included copolymers of a vinyl ester with esters of copolymerizable monoethylenically unsaturated dicarboxylic acids, such as dibutyl maleate, diethyl fumarate, dioctyl maleate and the like; copolymers of a vinyl ester with other vinyl esters, such as vinyl propionate, vinyl butyrate, vinyl hexoate, vinyl benzoate and the like; copolymers of a vinyl ester with a vinyl halide, such as vinyl chloride and vinyl bromide; copolymers of a vinyl ester with lower alkyl esters of acrylic acid such as methyl acrylate, propyl acrylate, butyl acrylate, hexyl acrylate, octyl acrylate and the like; copolymers of a vinyl ester with lower alkyl esters of methacrylic acid such as methyl methacrylate, propyl methacrylate, butyl methacrylate, hexyl methacrylate, octyl methacrylate and the like; copolymers of a vinyl ester with monoethylenically unsaturated carboxylic acids such as acrylic acid, methacrylic acid, crotonic acid and the like; copolymers of vinyl esters with other ethylenic monomers, such as ethylene, propylene, isobutylene and others. The useful vinyl alcohols are well known as is their method of preparation as hereinbefore disclosed.

The preferred type of vinyl alcohol polymer is a partially hydrolyzed polyvinyl acetate containing from 0 to 80% by weight of residual acetate groups, calculated as polyvinyl acetate. Said materials are available commercially. Their water-dispersibility is well known and depends as much on molecular weight as it does on residual ester content. Their molecular weight should be such that the resins possess a viscosity within the range of 1.3 to 100 centipoises as 4% by weight aqueous solutions at 20° C. To further illustrate the dependence of the polymer's water-dispersibility upon molecular weight and residual acetate content for the practice of the invention, it can be noted that whereas a partially hydrolyzed polyvinyl acetate having a 70–76% residual acetate content and a 6–7 centipoise viscosity for a 4% by weight solution in an equipart mixture of isopropanol and water is a suitable material, the copolymer having the same residual acetate content but a viscosity of 70–95 centipoises is unsuitable.

In the preferred compositions of the invention comprising 95–75 parts vinyl alcohol polymer and 5–25 parts plasticizer, the vinyl alcohol polymers consist of partially hydrolyzed polyvinyl acetate having a viscosity in the range 4–60 centipoises for a 4% aqueous solution at 20° C. and a residual acetate content in the range 28–43%. At higher molecular weights for the vinyl alcohol polymer, some plasticizer migrates when incorporated in the levels above shown and films prepared from the plasticized composition do not have adequate cold water dispersibility. When lower molecular weight hydrolyzed polyvinyl acetates are employed to prepare the plasticized composition, the films obtained lack optimum strength and continuity, and some plasticizer is exuded. The 28–43% residual acetate range is preferred for maximum water dispersibility of the film prepared from the plasticized composition. Above a 43% acetate content the vinyl alcohol polymer loses some hot water solubility. Below the 28% acetate content the compatibility with the preferred plasticizers is reduced.

The particular plasticizers of this invention are the monophenyl ethers of polyoxyethylene. These compounds are available commercially as mixtures of different molecular weight components. They can be represented by the following formula

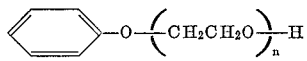

in which $n$ is an integer ranging from about 3 to about 15. It should be noted that, as shown by Example 4, the presence of alkyl substituents on the phenyl group renders the compounds incompatible with the water-dispersible resins of choice.

The method of incorporation of the plasticizer is not critical in that any well known method may be employed. Besides utilizing the method described in the above examples, the plasticizer may be incorporated into a mass of the vinyl alcohol polymer in a Banbury mixer. The latter method of plasticization when followed by pelletizing and eventually blow extruding yields films which possess excellent properties.

It is not intended to limit the present invention to a mixture of a vinyl alcohol polymer and a plasticizer. For example, the addition of antioxidants and slip agents into the present compositions result in further improved properties of the plasticized compositions. It will be obvious that pigments, pigment extenders and other inert materials may also be added to the present plasticized compositions without difficulty. It is to be understood therefore that this invention is not to be limited except by the scope of the following claim.

What is claimed is:

A polyvinyl alcohol resin composition consisting essentially of a mixture of 95 to 75 parts by weight of a polyvinyl alcohol containing from 28 to 43% by weight of residual acetate groups, calculated as polyvinyl acetate, and having a viscosity of 4 to 60 centipoises as a 4% by weight aqueous solution at 20° C., with 5 to 25 parts of a water-dispersible plasticizer having the general formula

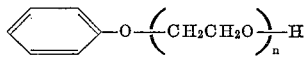

in which $n$ is an integer within the range of about 3 to about 15.

References Cited
UNITED STATES PATENTS

| | | | |
|---|---|---|---|
| 2,351,301 | 6/1944 | Sonnichsen | 260—33.2 |
| 2,850,471 | 9/1958 | Klein | 260—33.2 |
| 2,889,297 | 6/1959 | Brandner et al. | 260—33.2 |

MORRIS LIEBMAN, *Primary Examiner.*

L. T. JACOBS, *Assistant Examiner.*